Oct. 1, 1957  H. A. WILLIAMS  2,808,196
PORTABLE ELECTRIC AIR PUMP FOR BAIT RECEPTACLES
Filed June 24, 1955

INVENTOR.
HARRY A. WILLIAMS
BY
McMorrow, Berman & Davidson
ATTORNEYS

United States Patent Office 2,808,196
Patented Oct. 1, 1957

2,808,196

PORTABLE ELECTRIC AIR PUMP FOR BAIT RECEPTACLES

Harry A. Williams, Fort Worth, Tex.

Application June 24, 1955, Serial No. 517,803

3 Claims. (Cl. 230—117)

The present invention relates to a portable electric air pump for aerating a bait receptacle.

An object of the present invention is to provide a portable air pump for supplying air under pressure to the bottom of a receptacle containing water and live minnows or other bait for the purpose of keeping such bait supplied with air.

Another object of the present invention is to provide a portable electric air pump for aerating a bait receptacle and one which has a self-contained source of electric current which may be connected to a source of recharging current.

A further object of the present invention is to provide a compact portable bait receptacle aerating device of sturdy construction, simple in structure, and one economical to manufacture and assemble.

Figure 1:
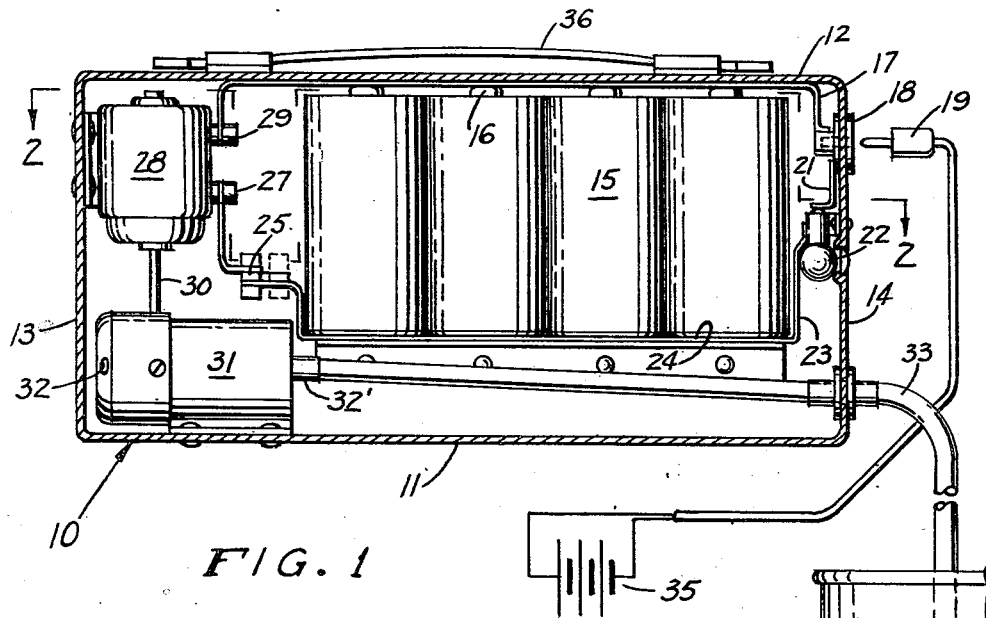
Figure 2:
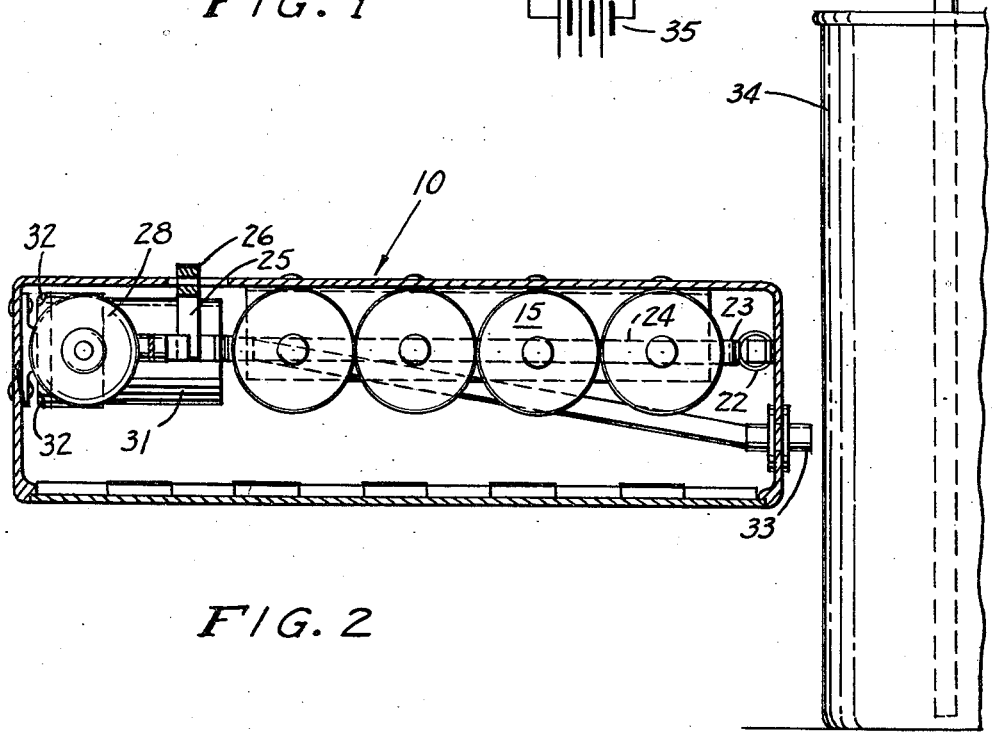

These and other objects of the present invention will be fully apparent from the following description when taken in connection with the annexed drawings, in which:

Figure 1 is a vertical view with the housing of the present invention broken away and showing a portion of a bait receptacle, and Figure 2 is a side view on line 2—2 of Figure 1.

Referring in greater detail to the drawing in which like numerals indicate like parts throughout the several views, the portable electric air pump of the present invention comprises a housing 10 fabricated of electrically nonconductive material such as plastic or the like, and having side walls 11 and 12 and end walls 13 and 14. A plurality of storage batteries 15 are arranged in longitudinal side by side relation within the housing 10, each of the batteries having a shell of electrically conductive material and having one terminal 16 projecting from one end of the shell and positioned adjacent to and spaced from the side wall 12 of the housing. A conductor 17 extends along the side wall 12 interposed between that wall and the terminals 16 and electrically in contact with the latter. In the end wall 14 of the housing 10 adjacent and spaced from the side wall 12 is a female electrical connector 18 having one side thereof connected in circuit with the conductor 17. A male electrical connector 19 is provided for engagement with the female connector 18 and is adapted to be connected to the storage battery of an automobile or other source of recharging current, the batteries 15 being the rechargeable type.

A second conductor 21 connects the other side of the female connector 18 to one contact of an incandescent lamp bulb 22 which serves as a resistance unit and has its other contact connected in circuit with a third conductor 23 which extends along the other ends of the shells of the batteries in contact therewith.

A switch 25 has its end 26 projecting exteriorly of the housing, as seen in Figure 2, and is interposed in the circuit of the third conductor so as to control the flow of current to the one terminal 27 of an electric motor 28, the other terminal 29 of the motor being connected in circuit with the conductor 17 at the end of the latter remote from the female connector 18.

The motor 28 is positioned adjacent the end wall 13 and fixedly supported thereon with its shaft 30 extending transversely of the housing 10, and an air pump 31 of the centrifugal type is positioned adjacent the motor 28 and is operatively connected to and driven by the shaft 30. The pump 31 has an air inlet 32 at one end and an outlet 32' at the other end. A flexible conduit 33 is connected by one end to the outlet and has its other end adapted to be inserted into a receptacle indicated by the reference numeral 34 in Figure 1 in which minnows or other live bait are stored and transported, there being water contained in the receptacle while the latter is in use which if not continually aerated by an aerating device such as is provided by the present invention would soon lose its content of entrapped air. A handle 36 is provided on the one side wall 12.

In use, the batteries may be used to supply current to the motor while the aerating device of the present invention and the bait receptacle are remote from a source of other current and the batteries may be recharged when exhausted of current by attaching the male connector to a battery, the latter being illustrated diagrammatically and indicated by the reference numeral 35 in Figure 1. The series connected lamp bulb should be of a voltage compatible with the voltage of the source of the recharging current taken into consideration with the voltage of the motor and that of the batteries, the latter being connected in parallel.

What is claimed is:

1. A portable electric air pump for aerating a bait-containing receptacle comprising a housing fabricated wholly of electrically nonconductive material and including spaced side walls and one end wall, a motor positioned within said housing and fixedly supported on said one end wall, a plurality of storage batteries each having a shell of electrically conductive material and a terminal projecting from one end of said shell with the other end of said shell constituting the other terminal, said batteries being positioned within said housing in longitudinal side by side relation with their one terminal adjacent to and spaced from one of said side walls and the other terminals spaced from the other of said side walls, a conductor extending along said one side wall and connected in circuit with said one terminal and having one end connected to said motor, a pump fixedly positioned within said housing adjacent said motor and drivingly connected to said motor, another conductor extending along the other ends of said shells in contact therewith and having one end connected to said motor, said pump having an inlet for air at one end thereof and an outlet at the other end, and conduit means connected by one end to said outlet and having its other end adapted to be inserted into a receptacle to be aerated.

2. A portable electric air pump for aerating a bait-containing receptacle comprising a housing fabricated wholly of electrically nonconductive material and including spaced side walls and one end wall, a motor positioned within said housing and fixedly supported on said one end wall and having its shaft extending transversely of said housing, a plurality of storage batteries each having a shell of electrically conductive material and a terminal projecting from one end of said shell with the other end of said shell constituting the other terminal, said batteries being positioned within said housing in longitudinal side by side relation with their one terminal adjacent and spaced from one of said side walls and the other terminal spaced from the other of said side walls, a conductor extending along said one side wall and connected in circuit with said one terminal and connected to said motor, a pump fixedly positioned within said housing adjacent said motor and drivingly connected to said shaft, another conductor extending along the other ends of said shells in contact therewith and having one end connected to said motor, said pump having an inlet for air at one end thereof and an outlet at the other end, and conduit means connected by one end to said outlet and having its other end adapted to be inserted into a receptacle to be aerated.

3. A portable electric air pump for aerating a bait-containing receptacle comprising a housing fabricated wholly of electrically nonconductive material and including spaced side walls and one end wall, a motor positioned within said housing and fixedly supported on said one end wall and having its shaft extending transversely of said housing, a plurality of storage batteries each having a shell of electrically conductive material and a terminal projecting from one end to said shell with the other end of said shell constituting the other terminal, said batteries being positioned within said housing in longitudinal side by side relation with their one terminal adjacent to and spaced from one of said side walls and the other terminals spaced from the other of said side walls, a conductor extending along said one side wall and connected in circuit with said one terminal and having one end connected to said motor, a pump fixedly positioned within said housing adjacent said motor and drivingly connected to said shaft, a switch mounted within said housing connected in circuit with said motor, another conductor extending along the other ends of said shells in contact therewith and having one end connected to said switch, said pump having an inlet for air at one end thereof and an outlet at the other end, and conduit means connected by one end to said outlet and having its other end adapted to be inserted into a receptacle to be aerated.

References Cited in the file of this patent

FOREIGN PATENTS

| | | |
|---|---|---|
| 476,291 | Great Britain | Dec. 6, 1937 |
| 488,502 | Canada | Dec. 2, 1952 |
| 629,272 | Germany | Apr. 25, 1936 |
| 897,911 | Germany | Nov. 26, 1953 |